(12) United States Patent
Harada et al.

(10) Patent No.: US 11,702,970 B2
(45) Date of Patent: Jul. 18, 2023

(54) OUTBOARD MOTOR

(71) Applicant: HONDA MOTOR CO., LTD., Tokyo (JP)

(72) Inventors: Yoshihiro Harada, Wako (JP); Tatsuya Kuroda, Wako (JP); Hiroshi Yamamoto, Wako (JP); Takeshi Okada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 17/413,964

(22) PCT Filed: Dec. 17, 2018

(86) PCT No.: PCT/JP2018/046402
§ 371 (c)(1),
(2) Date: Jun. 15, 2021

(87) PCT Pub. No.: WO2020/129133
PCT Pub. Date: Jun. 25, 2020

(65) Prior Publication Data
US 2022/0034246 A1 Feb. 3, 2022

(51) Int. Cl.
*F01N 3/04* (2006.01)
*B63H 20/28* (2006.01)
(Continued)

(52) U.S. Cl.
CPC ............ *F01N 3/04* (2013.01); *B63H 20/245* (2013.01); *B63H 20/28* (2013.01); *B63H 20/32* (2013.01);
(Continued)

(58) Field of Classification Search
CPC combination set(s) only.
See application file for complete search history.

(56) References Cited

U.S. PATENT DOCUMENTS 5,149,284 A * 9/1992 Kawai .................. B63H 20/245
440/89 R
5,232,387 A * 8/1993 Sumigawa ............ F01N 13/004
440/88 L
(Continued)

FOREIGN PATENT DOCUMENTS

JP 2000-337142 12/2000

OTHER PUBLICATIONS

International Search Report and Written Opinion for International Application No. PCT/JP2018/046402 dated Feb. 5, 2019, 12 pages.

*Primary Examiner* — Stephen P Avila
(74) *Attorney, Agent, or Firm* — Amin, Turocy & Watson, LLP

(57) ABSTRACT

An outboard motor is provided with an upper separator disposed on the lower side of an oil case for storing a lubricating oil of an engine, and an extension case which is separably connected on the lower side of the upper separator. The upper separator has a central exhaust passage through which exhaust gas flows, and a cooling water flow part through which cooling water flows on the outside of the central exhaust passage, the central exhaust passage and the cooling water flow part forming an integrated structure. The exhaust gas and the cooling water are caused to mix in the extension case.

10 Claims, 10 Drawing Sheets

(51) Int. Cl.
  *B63H 20/32*      (2006.01)
  *B63H 20/24*      (2006.01)
  *F01P 3/20*       (2006.01)

(52) U.S. Cl.
  CPC ........ *F01P 3/202* (2013.01); *B63H 2020/323* (2013.01); *F01P 2060/00* (2013.01)

(56) References Cited

U.S. PATENT DOCUMENTS 6,296,537 B1   10/2001  Toyama et al.
7,128,027 B1 * 10/2006  Straub .................... F01N 3/046
                                                  440/88 L

* cited by examiner

OUTBOARD MOTOR

TECHNICAL FIELD

The present invention relates to an outboard motor in which an exhaust gas of an internal combustion engine is cooled by cooling water.

BACKGROUND ART

An outboard motor includes: an engine (an internal combustion engine) that rotates a propeller; and a cooling structure that cools, by cooling water, an exhaust gas of the engine, on a lower side of the engine. For example, an outboard motor disclosed in JP 2000-337142 A includes an exhaust tube on a lower side of an oil pan, and includes a cooling-water discharge path on an outer side of the exhaust tube within a drive shaft housing (a case). That is, when the exhaust gas of the engine flows through the exhaust tube, the exhaust gas is cooled by the cooling water of the cooling-water discharge path.

SUMMARY OF INVENTION

However, since the cooling structure of the outboard motor disclosed in JP 2000-337142 A has, disposed within the case, the exhaust tube and the like which are configured by separate members from the case, it results in the increased number of components, and, consequently, manufacturing costs are increased. Moreover, since the exhaust tube extends for a short distance in the case, there is a high probability of cooling water easily intruding into the exhaust tube to corrode the exhaust tube. Moreover, since the outboard motor needs to have a portion for connection between the case and a structure allowing the exhaust gas to flow, there arises a disadvantage of the case itself becoming large-sized.

Furthermore, the case disclosed in JP 2000-337142 A is molded as a sequentially continuous member in a vertically-extending direction. Therefore, a need arises for cases and tubes of different sizes to be molded, depending on the outboard motor whose size changes due to the capacity of the engine, and so on. This results in further increased manufacturing costs of the outboard motor.

The present invention has been made in view of the above-described situation, and has an object of providing an outboard motor that enables cooling noise and exhaust noise of an exhaust gas to be suppressed, intrusion of cooling water into an exhaust gas channel to be suppressed, and, furthermore, downsizing and cost reduction to be achieved, by a simple configuration.

In order to achieve the above object, an aspect of the present invention is an outboard motor including an internal combustion engine and a cooling structure, the cooling structure cooling an exhaust gas of the internal combustion on a lower side of the internal combustion engine, the cooling structure including: an oil case that stores a lubricating oil of the internal combustion engine; a first case which is disposed on a lower side of the oil case, the first case including an exhaust gas channel that allows the exhaust gas of the internal combustion engine to flow and a cooling water flow portion that allows cooling water to flow on an outer side of the exhaust gas channel, the exhaust gas channel and the cooling water flow portion forming an integral structure; and a second case which is separably coupled to the first case on a lower side of the first case, and in which the exhaust gas that has flowed through the exhaust gas channel and the cooling water that has flowed through the cooling water flow portion are mixed.

In the above-described outboard motor, an exhaust gas of the exhaust gas channel is cooled by the cooling water flow portion on an outer side in the first case, and, furthermore, the exhaust gas and cooling water are mixed in the second case. As a result, the exhaust gas is significantly cooled, and its exhaust noise is thereby suppressed. Moreover, in the first case, the exhaust gas channel and the cooling water flow portion form an integral structure, so a place for connection of an exhaust tube or the like becomes unnecessary, and downsizing and cost reduction of the outboard motor are achieved. Moreover, in the first case, the exhaust gas and the cooling water flow along different paths, hence intrusion of cooling water into the exhaust gas channel and a main exhaust path of the oil case can be suppressed. Furthermore, regarding the mutually separable first case and second case, all that is required when sizes of outboard motors differ is that, for either one of the first and second cases, there be prepared cases having different heights or there be laminated a plurality of cases. As a result, manufacturing costs can be further reduced.

DESCRIPTION OF EMBODIMENTS

A preferred embodiment of the present invention will be presented and described in detail below with reference to the accompanying drawings.

Figure 1:
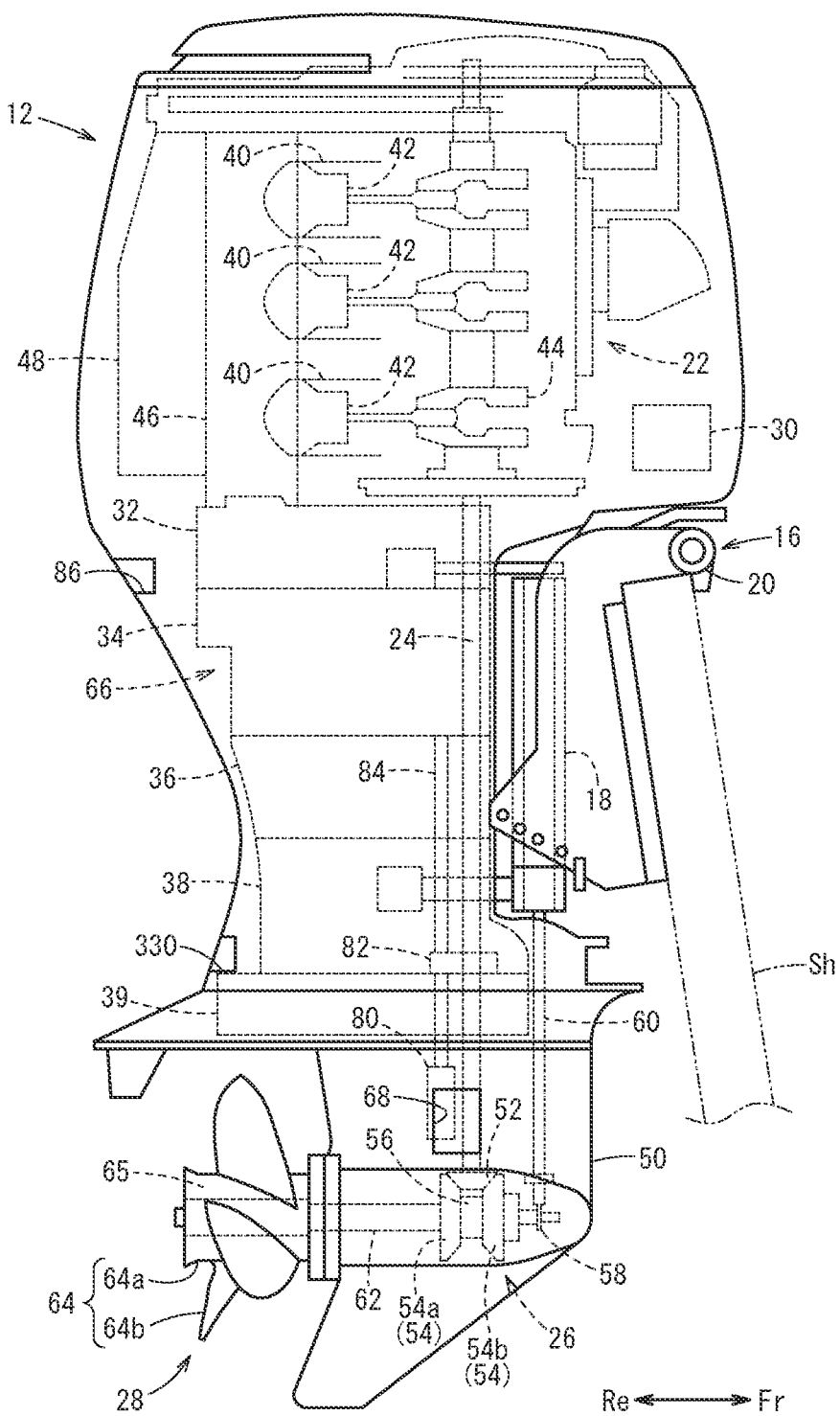
FIG. 1 is a side view showing an overall configuration of an outboard motor according to an embodiment of the present invention.

An outboard motor 10 according to an embodiment of the present invention, as shown in FIG. 1, is mounted on a ship body Sh, as a power source of a small ship or the like, and is driven under operation of a user to propel the ship body Sh. The outboard motor 10 comprises: a housing 12 configuring an outward appearance; and a mounting mechanism 16 by which the outboard motor 10 is fixed to the ship body Sh at a position forward (on an arrow Fr direction side) of the housing 12. The mounting mechanism 16 enables the housing 12 to swing to left and right around a swivel shaft 18 in planar view, and enables the housing 12 including the swivel shaft 18 to revolve clockwise in FIG. 1 or counterclockwise in FIG. 1 around a tilt shaft 20.

On an inside of the housing 12, there are housed an engine 22 (an internal combustion engine), a drive shaft 24, a gear mechanism 26, a propeller mechanism 28, and a control unit 30. Moreover, on a side below the engine 22 within the housing 12, there are provided in order from an upper portion to a lower portion a mounting bracket 32, an oil case 34, an upper separator 36, and an extension case 38.

As the engine 22, there is applied a vertical type multi-cylinder engine (for example, a 3-cylinder engine). The engine 22 includes three cylinders 40 each of whose axis line extends sideways (substantially horizontal), the three cylinders being arranged in an up-down direction and in parallel with each other. The engine 22 further includes a crank shaft 44 which is coupled to piston rods 42 of each of the cylinders 40 and which extends in the up-down direction. A cylinder block 46 and a cylinder head 48 of the engine 22 are provided with a cooling water jacket 22a (refer to FIG. 2) that cools the engine 22.

A lower end portion of the crank shaft 44 of the engine 22 has coupled thereto an upper end of the drive shaft 24. The drive shaft 24 extends in the up-down direction (a longitudinal direction) within the housing 12, and freely rotates around its own axis. A lower end of the drive shaft 24 is housed in the gear mechanism 26.

The gear mechanism 26 has a gear case 50 which is coupled to the extension case 38 via a transom adjustment case 39. On an inside of the gear case 50, there are provided: a drive bevel gear 52 which is fixed to the lower end of the drive shaft 24; and driven bevel gears 54 (a forward-movement driven bevel gear 54a and a reverse-movement driven bevel gear 54b) that mesh with this drive bevel gear 52 to rotate in a direction orthogonal to the drive shaft 24. Moreover, the gear mechanism 26 has: a dog clutch 56 capable of meshing with inner side tooth surfaces (not illustrated) of the driven bevel gears 54; and a shift slider 58 coupled via an unillustrated coupling bar to the dog clutch 56. The shift slider 58 extends so as to advance and retract along an inside of a propeller shaft 62 of the later-mentioned propeller mechanism 28, and has its end portion on a forward side exposed from the propeller shaft 62. The shift slider 58 comprises a groove in its exposed portion, and this groove has inserted therein a cam portion (not illustrated) of an operating shaft 60 extending above the gear case 50.

An upper end of the operating shaft 60 is connected to an unillustrated shift actuator in a manner enabling the operating shaft 60 to revolve, and the shift actuator is driven according to a shift operation of the user. That is, by the shift slider 58 advancing and retracting in an axial direction of the propeller shaft 62 due to rotation of the operating shaft 60, the gear mechanism 26 moves the dog clutch 56 between the pair of driven bevel gears 54. As a result, a tooth surface of the dog clutch 56 meshes with one of the inner side tooth surface of the forward-movement driven bevel gear 54a or the inner side tooth surface of the reverse-movement driven bevel gear 54b.

The propeller mechanism 28, which is provided on a side to the rear (in an arrow Re direction) of a lower portion (the gear case 50) of the housing 12, has: the propeller shaft 62 which is capable of rotating around its own axis; and a propeller main body 64 coupled to the propeller shaft 62. The propeller shaft 62 has its one end portion (its forward portion) disposed in the gear mechanism 26 in a state of the shift slider 58 having been housed in its inside as mentioned above. The propeller shaft 62 has a long hole (not illustrated) in which the coupling bar coupling between the dog clutch 56 and the shift slider 58 is disposed in a manner enabling the coupling bar to move in an axial direction of the long hole.

The propeller main body 64 has: a tubular body 64a that surrounds the propeller shaft 62 on an outer side in a radial direction of the propeller shaft 62; and a plurality of fins 64b that are coupled to an outer peripheral surface of the tubular body 64a. An inner side of this tubular body 64a is provided with a through-hole 65 that communicates with a space within the gear case 50.

In the outboard motor 10 configured as above, a rotational driving force of the crank shaft 44 of the engine 22 is transmitted via the drive shaft 24 and the drive bevel gear 52 to the forward-movement driven bevel gear 54a and the reverse-movement driven bevel gear 54b. Moreover, by the dog clutch 56 meshing with one of the inner side tooth surface of the forward-movement driven bevel gear 54a or the inner side tooth surface of the reverse-movement driven bevel gear 54b, a rotational driving force of one of the driven bevel gears 54 is transmitted to the propeller main body 64 via the dog clutch 56 and the propeller shaft 62. As a result, the propeller main body 64 rotates clockwise or counter-clockwise with the propeller shaft 62 as a rotational center, thereby causing the ship body Sh to move forward or move in reverse.

Moreover, the mounting bracket 32, the oil case 34, the upper separator 36, and the extension case 38 that are provided within the housing 12 are stacked in the up-down direction and have their adjacent members coupled by unillustrated fastening bolts. Note that the members each have sandwiched therebetween the likes of an unillustrated gasket that blocks leakage of a liquid or gas. The oil case 34, the upper separator 36, and the extension case 38 configure a cooling structure 66 of the outboard motor 10, the cooling structure 66 cooling an exhaust gas of the engine 22.

The mounting bracket 32 holds on its upper surface the engine 22, and is fixed to an upper end of the swivel shaft 18. The oil case 34 stores a lubricating oil of the engine 22. The upper separator 36 functions as a spacer between the oil case 34 and the extension case 38. The extension case 38 configures a portion where the exhaust gas discharged from the housing 12 and water are mixed.

The engine 22 and the cooling structure 66 are configured as a water-cooling system in which water such as sea water or fresh water (hereafter, called cooling water) that has been taken in from outside of the housing 12 is supplied to the engine 22 to cool the engine 22. Accordingly, on a lower portion side (above the gear mechanism 26) of the housing 12, there is provided a water intake port 68 for taking in the cooling water to inside of the housing 12. Moreover, the cooling water used in cooling of the engine 22 and so on, is mixed with the exhaust gas, after which it is discharged to outside of the housing 12 through the through-hole 65 of the propeller main body 64.

Figure 2:
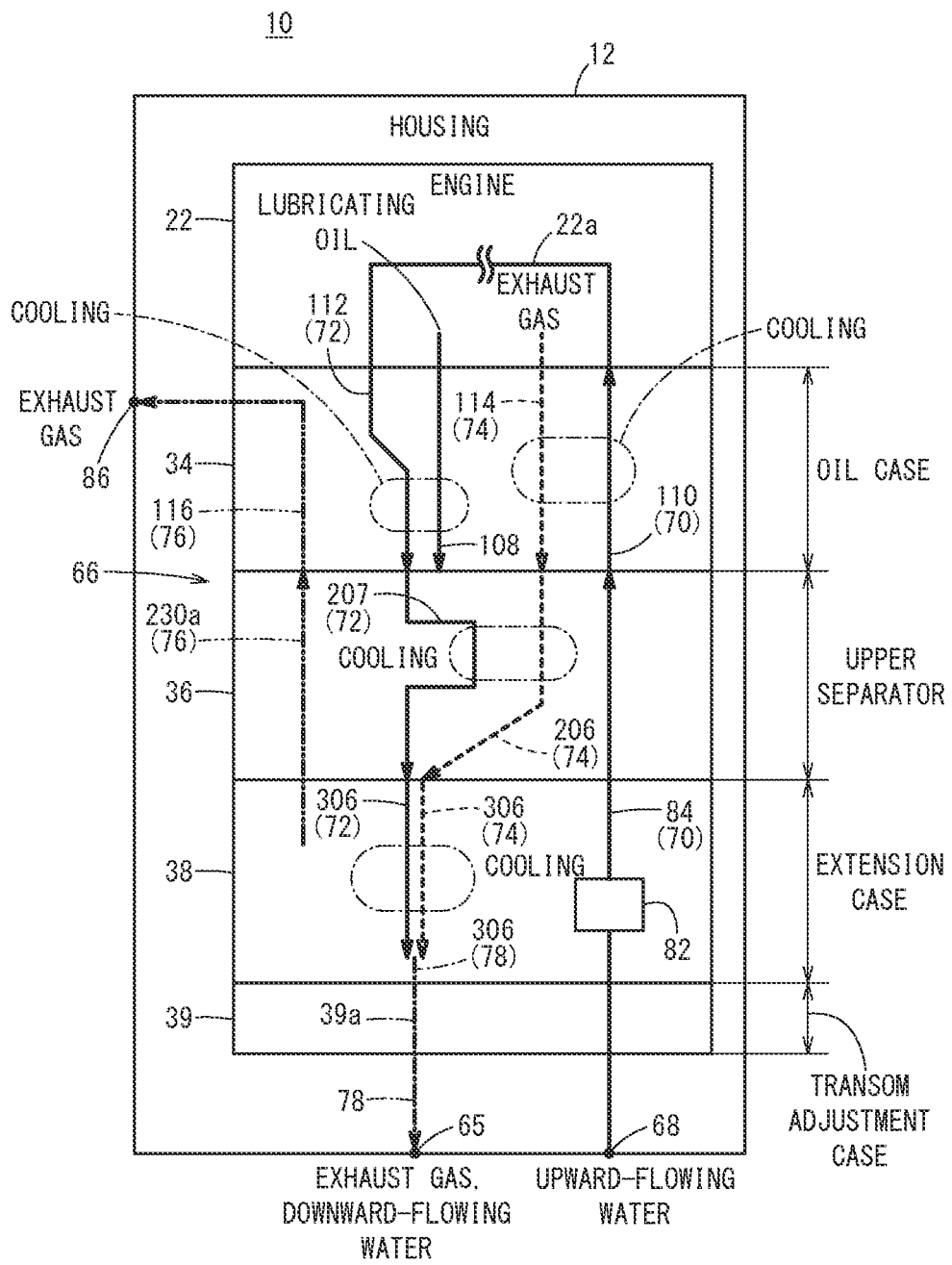
FIG. 2 is an explanatory diagram schematically showing a cooling structure of the outboard motor.

As shown in FIG. 2, the cooling structure 66 comprises: a cooling water inlet path 70 that guides the cooling water (hereafter, also called cooling supply water) to the engine 22 from the water intake port 68; and a cooling water outlet path 72 that guides the cooling water that has cooled the engine 22 (hereafter, also called cooling discharge water). Moreover, the cooling structure 66 comprises, on an inner side of the oil case 34, upper separator 36, and extension case 38, a main exhaust gas passage 74 and a subsidiary exhaust gas passage 76 along which the exhaust gas flows, and has a function of cooling the exhaust gas flowing along the main exhaust gas passage 74 by the cooling water. Note that the subsidiary exhaust gas passage 76 is a passage that guides the exhaust gas (hereafter, also called idling time exhaust gas) within the housing 12, based on a lowering of a discharge amount of the exhaust gas from the through-hole 65 at a time of low-speed rotation (idling) of the engine 22 and so on. The cooling water outlet path 72 and the main exhaust gas passage 74 merge on the lower portion side (in the extension case 38) of the housing 12 to become a mixed fluid passage 78. Furthermore, the cooling structure 66 is configured to cool the lubricating oil of the engine 22 stored in the oil case 34.

The cooling water inlet path 70 includes: the water intake port 68; a cooling water screen 80 (refer to FIG. 1) disposed in a vicinity of the water intake port 68 within the housing 12; a water pump 82 provided above the cooling water screen 80; and a cooling water supply pipe 84 connected to the water pump 82. The water pump 82, which is housed within the extension case 38, sucks in the cooling water via the water intake port 68. Furthermore, the water pump 82 causes the suctioned cooling water to flow, as the cooling supply water, upwardly through the cooling water supply pipe 84.

The cooling water supply pipe 84 extends in an upward direction from the water pump 82 through the extension case 38 and the upper separator 36, and has its upper end connected to a lower portion of the oil case 34. As a result, the cooling supply water of the cooling water supply pipe 84 sustainably flows into the oil case 34 (a lead-in path 110), and a water level proceeds to increase within the oil case 34. Moreover, the cooling supply water that has flowed upwardly from the oil case 34 flows into the cooling water jacket 22a of the engine 22 to cool the engine 22.

On the other hand, the cooling water outlet path 72 is configured to include: a lead-out path 112 within the oil case 34; a cooling water flow portion 207 within the upper separator 36; and a mixing space 306 within the extension case 38. That is, the cooling water that has cooled the engine 22 becomes the cooling discharge water to flow into the lead-out path 112 of the oil case 34. At a time of this cooling discharge water flowing downwardly along the lead-out path 112, it cools (performs heat exchange with) the lubricating oil stored in the oil case 34.

Moreover, the cooling discharge water, upon moving into the upper separator 36 from the oil case 34, is temporarily stored in the cooling water flow portion 207 of the upper separator 36, after which it is discharged from the cooling water flow portion 207 into the extension case 38. Then, in the mixing space 306 within the extension case 38, the cooling discharge water mixes with the exhaust gas as mentioned above while cooling the exhaust gas, and thereby becomes a mixed fluid.

The main exhaust gas passage 74 along which the exhaust gas of the engine 22 is caused to flow is configured to include: a main exhaust path 114 of the oil case 34; a central exhaust path 206 of the upper separator 36; and the mixing space 306 of the extension case 38. Moreover, the exhaust gas that has flowed into the main exhaust gas passage 74 flows in a downward direction along the main exhaust gas passage 74 due to exhaust pressure of the engine 22.

The exhaust gas is cooled (undergoes heat exchange) due to the cooling supply water of the lead-in path 110 in the main exhaust path 114 of the oil case 34. Moreover, the exhaust gas flows into the central exhaust path 206 of the upper separator 36 from the main exhaust path 114, and is thereupon cooled by the cooling water flow portion 207. Furthermore, the exhaust gas flows into the mixing space 306 of the extension case 38 from the central exhaust path 206 and is cooled by mixing with the cooling discharge water.

Further still, the mixed fluid passage 78 is a cavity from the mixing space 306 of the extension case 38 to the through-hole 65 of the propeller main body 64. This mixed fluid passage 78 is configured by an inside of the transom adjustment case 39, a space between the housing 12 and the gear case 50, and so on.

On the other hand, the subsidiary exhaust gas passage 76 of the cooling structure 66 is configured to include: a subsidiary exhaust port 230a (a subsidiary exhaust gas hole portion) of the upper separator 36; and a subsidiary exhaust path 116 of the oil case 34. The exhaust gas filling the inside of the extension case 38 rises passing through the subsidiary exhaust port 230a of the upper separator 36 to flow into the subsidiary exhaust path 116 of the oil case 34. Then, the idling time exhaust gas, after having passed along the subsidiary exhaust path 116, flows into an exhaust port 86 (refer also to FIG. 1) provided at the rear of the housing 12 and is then discharged to outside of the housing 12.

Next, a specific structure of the oil case 34 will be described with reference to FIGS. 3 and 4.

The oil case 34 is disposed at an intermediate position in the up-down direction of the housing 12. The oil case 34 has a bowl shape having its upper portion opened and its lower portion roughly blocked. A front side (a side in the arrow Fr direction) of the oil case 34 is formed in a shape of a triangle having an obtusely-angled apex in planar (upper surface) view. A rear side (a side in the arrow Re direction) of the oil case 34 is formed in a shape of a semi-ellipse having large radius of curvature in planar view.

Moreover, an outer wall 102 (a wall portion 100) configuring an outer shape of the oil case 34 has a large planar surface area on its upper portion side, and a small planar surface area on its lower portion side, in order that it be capable of being precisely disposed in a constricted portion on the rear side of the housing 12. Specifically, the front side of the oil case 34 extends linearly in the up-down direction, while the rear side of the oil case 34 is inwardly notched toward the downward direction, as a stepped shape.

An inside of the oil case 34 is configured to have several spaces therein, defined by a partitioning wall 104 and a tubular wall 106 (the wall portion 100) that are integrally formed with the outer wall 102. As the spaces, there may be cited an oil chamber 108 that stores the lubricating oil, the lead-in path 110 that guides the cooling supply water to the upper side, the lead-out path 112 that guides the cooling discharge water to the lower side, the main exhaust path 114 that guides the exhaust gas to the lower side, and the subsidiary exhaust path 116 that guides the idling time exhaust gas to the upper side. The oil chamber 108, the lead-in path 110, the lead-out path 112, the main exhaust path 114, and the subsidiary exhaust path 116 are formed so as not to communicate with each other (i.e., so as to be independent from each other). Moreover, the front side of the oil case 34 is provided with a drive shaft-dedicated through-hole 118.

The drive shaft-dedicated through-hole 118 is provided at a position in a vicinity of the apex, and extends in the up and down direction along the inside of the oil case 34. The above-mentioned drive shaft 24 extending from the engine 22 to the gear mechanism 26 is disposed in a rotatable manner in this drive shaft-dedicated through-hole 118.

The oil chamber 108 (an oil pan) forms a largest space on the inside of the oil case 34. The oil chamber 108 has its periphery surrounded by the partitioning wall 104 of the oil case 34, and has its lower portion closed by the outer wall 102. The oil chamber 108 has its rear side formed in a semi-elliptical shape, while its front side is formed in a triangular shape, similarly to the outer shape of the oil case 34, in planar view.

Moreover, the oil chamber 108 is formed into a stepped shape in a manner that its lower portion on the rear side (a rear bottom wall 108a) is somewhat shallow and its lower portion on the front side (a front bottom wall 108b) is deeper. Therefore, the lubricating oil that has fallen into the oil chamber 108 flows to the front side of the oil chamber 108. In the outboard motor 10, unillustrated lubricating oil piping that sucks up the lubricating oil into the engine 22 is disposed on the front side of the oil chamber 108 (close to the front bottom wall 108b), and the lubricating oil is allowed to flow into the engine 22 from an opening of the lubricating oil piping.

The lead-in path 110 is provided closer to a front side than the oil chamber 108. The lead-in path 110 is a region sandwiched by the outer wall 102 on the front side of the oil case 34 and the partitioning wall 104 on the front side of the oil chamber 108, and is set to have a smaller capacity than the oil chamber 108. Moreover, the lead-in path 110 is formed as a substantially V-shaped space in planar view.

A bottom portion (a lead-in path bottom wall 110a) of the lower outer wall 102 configuring the lead-in path 110 is provided with a lead-in port 120 to which the cooling water supply pipe 84 is connected. The lead-in port 120 is disposed in a widthwise-direction central portion of the lead-in path bottom wall 110a (the oil case 34), and has a lead-in opening 120a that communicates with the lead-in path 110. The lead-in path bottom wall 110a is provided with a pair of drain holes 122 for draining the cooling supply water from the lead-in path 110. The pair of drain holes 122 are respectively provided at positions in vicinities of a pair of the main exhaust paths 114. The drain holes allow the cooling supply water of the lead-in path 110 to fall little by little into the upper separator 36 positioned below.

Moreover, the lead-in path 110 has disposed therein a tubular wall 106a configuring the main exhaust path 114. Moreover, both sides in the width direction of the lead-in path 110 are provided with respective dividing walls 124 which are slightly lower than the outer wall 102 or the partitioning wall 104 of the oil case 34. The lead-in path 110 is divided into a central portion chamber 126 and a pair of side portion chambers 128 by the dividing walls 124. However, the central portion chamber 126 and the pair of side portion chambers 128 are in communication with each other due to a later-mentioned gap 152 provided between the outer wall 102 and a back side of the tubular wall 106a.

Concerning the upper part of the lead-in path 110, in a state that the oil case 34 is coupled to the mounting bracket 32 (in an assembled state of the outboard motor 10), the central portion chamber 126 is blocked, while a communicating path (not illustrated) extending to the cooling water jacket 22a of the engine 22, and the side portion chamber 128 communicate with each other. Hence, when the cooling water (the cooling supply water) from the lead-in opening 120a flows into the lead-in path 110, this cooling supply water, while basically filling the central portion chamber 126, flows into the side portion chambers 128 on both left and right sides from the central portion chamber 126. Then, the cooling supply water flows into the cooling water jacket 22a of the engine 22 via the communicating path from each of the side portion chambers 128.

A pair of the lead-out paths 112 are provided respectively on both sides in the width direction of the oil chamber 108. The pair of lead-out paths 112 have their upper portions formed in a space surrounded by the outer wall 102 and the partitioning wall 104, and have their lower portions formed in a passage surrounded by a tubular wall 106b. The space of the lead-out path 112 is provided behind the lead-in path 110 so as to be a certain interval away from the lead-in path 110, and is configured to be capable of sufficiently receiving the cooling discharge water due to being upwardly opening and broadly formed.

On the other hand, the passage of the lead-out path 112 inclines inwardly in the width direction in a downward direction from the space of the lead-out path 112. That is, the tubular wall 106b configuring the lead-out path 112 projects further inwardly than the partitioning wall 104 surrounding the oil chamber 108, thus enabling the cooling discharge water passing through the lead-out path 112 to cool the lubricating oil stored in the oil chamber 108. For example, not less than half of an outer peripheral length of the tubular wall 106b is exposed to the interior of the oil chamber 108. As a result, a surface area of the tubular wall 106b contacting the lubricating oil is sufficiently secured. Moreover, a lower side of the tubular wall 106b (the lead-out path 112) is connected to the front bottom wall 108b of the oil chamber 108. Therefore, the passage of the lead-out path 112 has a lower portion opening 112a at a position precisely overlapping a lower surface of the oil chamber 108.

Moreover, a pair of main exhaust paths 114 are provided closer to the front side than the oil chamber 108 and the pair of lead-out paths 112. The main exhaust path 114 is formed in a passage surrounded by the tubular wall 106a, and substantially its entirety is disposed within the lead-in path 110. The tube of the tubular wall 106a is formed thicker than those of the tubular wall 106b of the lead-out path 112 and a tubular wall 106c of the subsidiary exhaust path 116. Therefore, the main exhaust path 114 has a flow path cross-sectional area sufficiently enabling the exhaust gas to flow. Note that the inside of the main exhaust path 114 may be provided with an unillustrated sensor (an oxygen concentration sensor, or the like) that detects a state of the exhaust gas.

The pair of main exhaust paths 114 respectively have upper portion openings 114a on both sides in the width direction in the upper portion of the oil case 34 (in the side portion chambers 128 of the lead-in path 110). Each of the main exhaust paths 114 extends forward and in the widthwise inward direction, from the upper portion toward the lower portion. More specifically, the main exhaust path 114 has, continuously linked up therein, from the upper portion toward the lower portion, an upper steeply-inclined region 130, a middle gently-inclined region 132, and a lower steeply-inclined region 134. The upper steeply-inclined region 130 steeply inclines in a downward direction in the side portion chamber 128. The middle gently-inclined region 132 extends from the side portion chamber 128 to the central portion chamber 126 to incline in the downward direction more gently in the inside of the central portion chamber 126 than the upper steeply-inclined region 130. The lower steeply-inclined region 134 more steeply inclines in the downward direction than the middle gently-inclined region 132 at a position close to a central portion in the width direction of the central portion chamber 126. Moreover, by the tubular wall 106a being coupled to the lead-in path bottom wall 110a at a position in a vicinity of the lead-in opening 120a on each side, the main exhaust path 114 has a lower portion opening 114b at a position overlapping the lead-in path bottom wall 110a of the lead-in path 110 (on each side in the width direction of the lead-in port 120).

Figure 5:
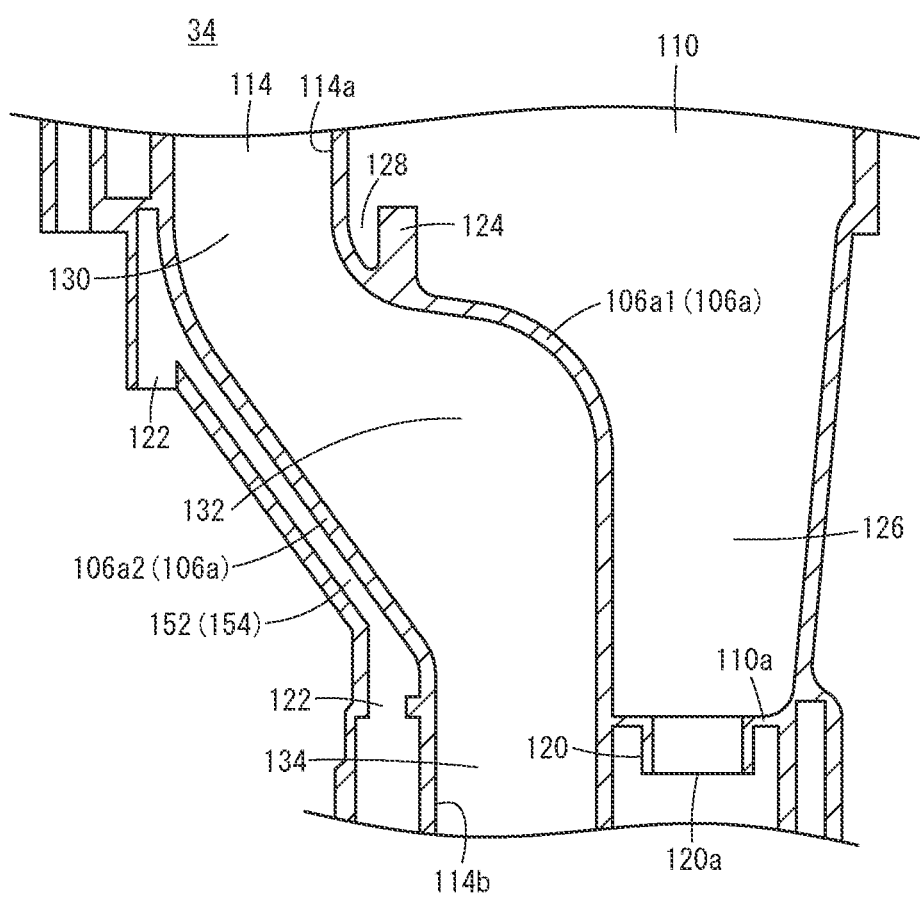
FIG. 5 is a cross-sectional view taken along the line V-V of FIG. 3.

Moreover, as shown in FIG. 5, an outer shape of the tubular wall 106a configuring the pair of main exhaust paths 114 is broad in the middle gently-inclined region 132 at a midway position in an extension direction. In detail, in the tubular wall 106a, a wall 106a1 on an opposite side to the gap 152 projects toward an inner side of the lead-in path 110 to curve greatly, while a wall 106a2 on a gap 152 side extends in parallel to the inclining outer wall 102. Therefore, the wall 106a1 and the wall 106a2 are most separated in a middle portion of the main exhaust path 114. Flow path cross-sectional areas of the pair of main exhaust paths 114 also expand in their middle gently-inclined region 132 depending on the outer shape of the tubular wall 106a. Further still, the outer wall 102 forming the gap 152 between itself and the tubular wall 106a is provided with the drain hole 122 that discharges the cooling supply water.

Figure 3:
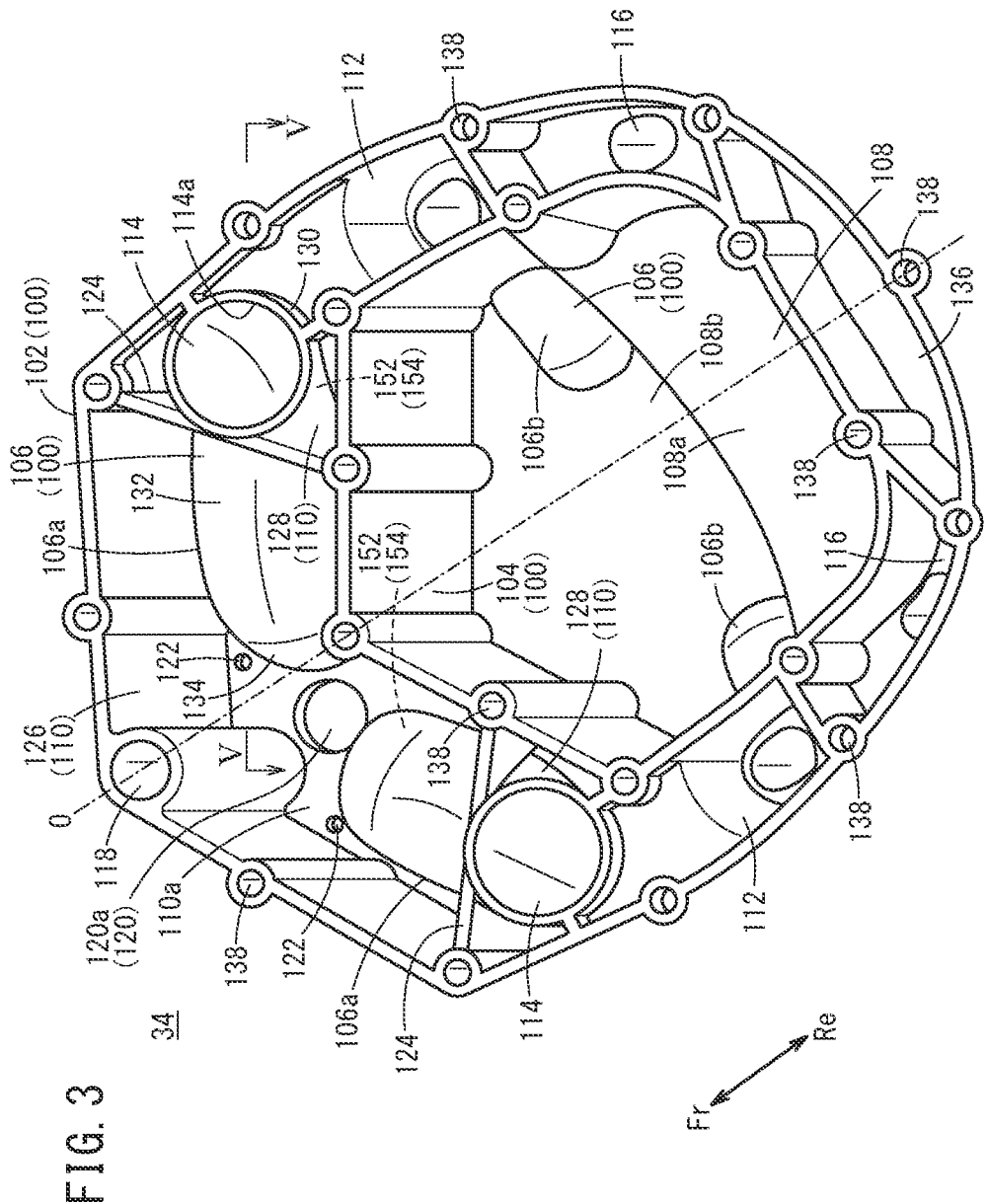
FIG. 3 is a perspective view of an oil case seen from its upper surface side.
Figure 4:
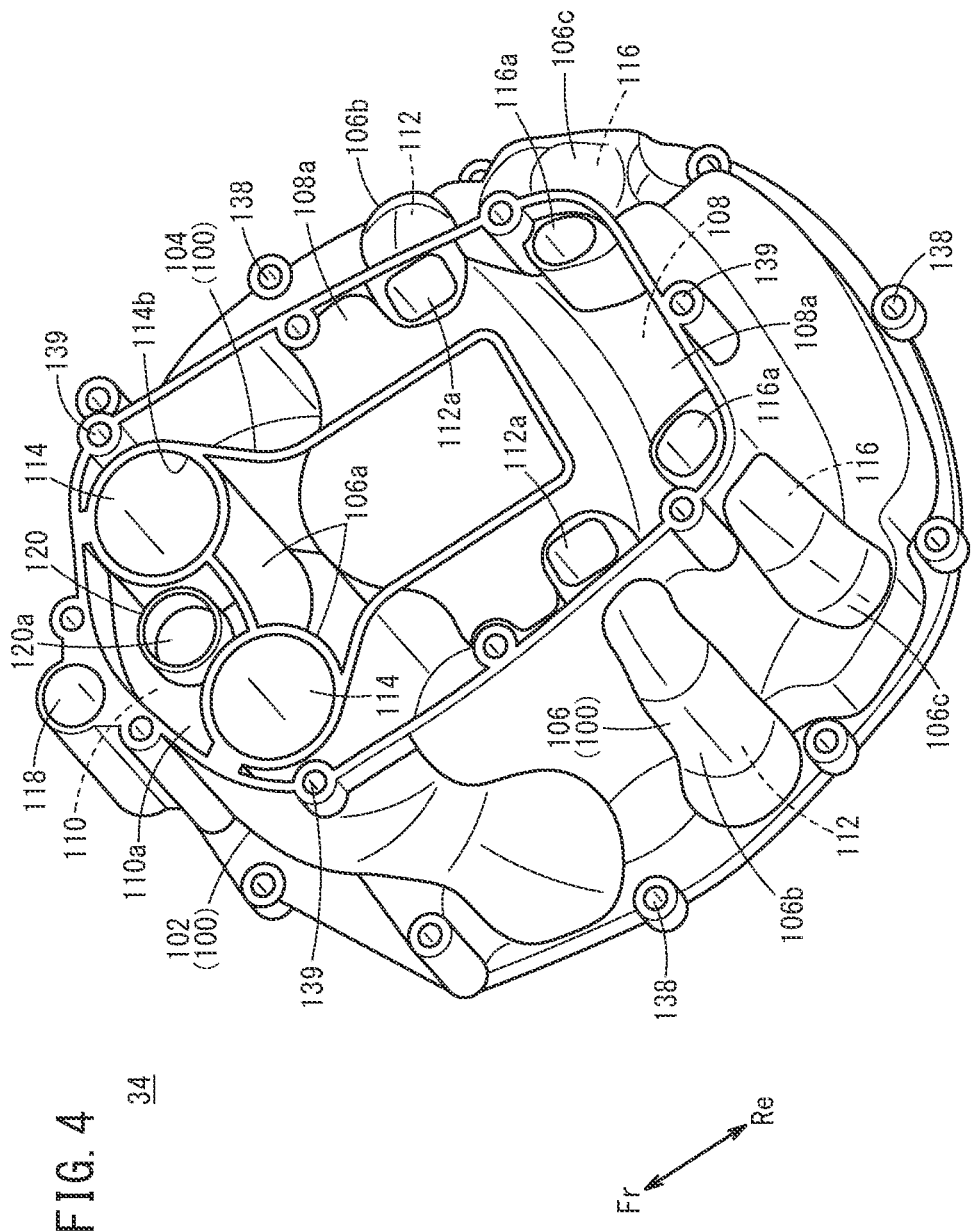
FIG. 4 is a perspective view of the oil case seen from its lower surface side.

On the other hand, as shown in FIGS. 3 and 4, a pair of the subsidiary exhaust paths 116 are provided on both sides in the width direction of the oil chamber 108 and closer to the rear side than the pair of lead-out paths 112. The pair of subsidiary exhaust paths 116 have their upper portions formed in a space surrounded by the outer wall 102 and the partitioning wall 104, and have their lower portions formed in a passage surrounded by the tubular wall 106c. The space of the subsidiary exhaust path 116 is in a position adjacent to the lead-out path 112, opens upwardly, and is broadly formed.

The tubular wall 106c configuring the subsidiary exhaust path 116 is formed with a flow path cross-sectional area slightly smaller than the flow path cross-sectional area defined by the tubular wall 106b of the lead-out path 112. This tubular wall 106c, although inclining to approach an inner side in the width direction in a downward direction of the oil case 34, is formed on an outside of the partitioning wall 104 configuring the oil chamber 108. Moreover, by the tubular wall 106c extending to a lower side of the rear bottom wall 108a, the passage of the subsidiary exhaust path 116 has a lower portion opening 116a disposed on a lower side of the rear bottom wall 108a.

Moreover, the oil case 34 further includes a subsidiary exhaust gas flow chamber 136 enabling the idling time exhaust gas to flow therethrough, provided on a rear (the arrow Re direction) side of the oil chamber 108 and the pair of subsidiary exhaust paths 116. That is, the oil chamber 108 of the oil case 34 is positioned on an inner side of the lead-in path 110, the lead-out path 112, the subsidiary exhaust path 116, and the subsidiary exhaust gas flow chamber 136 in planar view.

The oil case 34 configured as described above has a substantially left-right symmetrical shape with reference to a width direction center line O. In other words, in the oil case 34, the oil chamber 108, the lead-in path 110, the lead-in port 120 (the lead-in opening 120a), and the drive shaft-dedicated through-hole 118, which each are a single configuration, are formed so as to have a left-right symmetrical shape about the width direction center line O of the oil case 34. Each of the pair of lead-out paths 112, the pair of main exhaust paths 114, and the pair of subsidiary exhaust paths 116 is positioned symmetrically to each other about the width direction center line O, and extends in symmetrical extension directions (inclining downwardly and inwardly in the width direction).

Moreover, the upper portion of the oil case 34 is provided with a plurality of oil case upper portion female screw portions 138, and is provided with unillustrated packing. For example, the plurality of oil case upper portion female screw portions 138 are successively arranged along the outer wall 102 of the oil case 34 and the partitioning wall 104 configuring the oil chamber 108. Fastening of the mounting bracket 32 and the oil case 34 is performed by unillustrated fastening bolts being screwed into the oil case upper portion female screw portions 138. Similarly, the lower portion of the oil case 34 is provided with a plurality of oil case lower portion female screw portions 139 for performing coupling to the upper separator 36.

Figure 6:
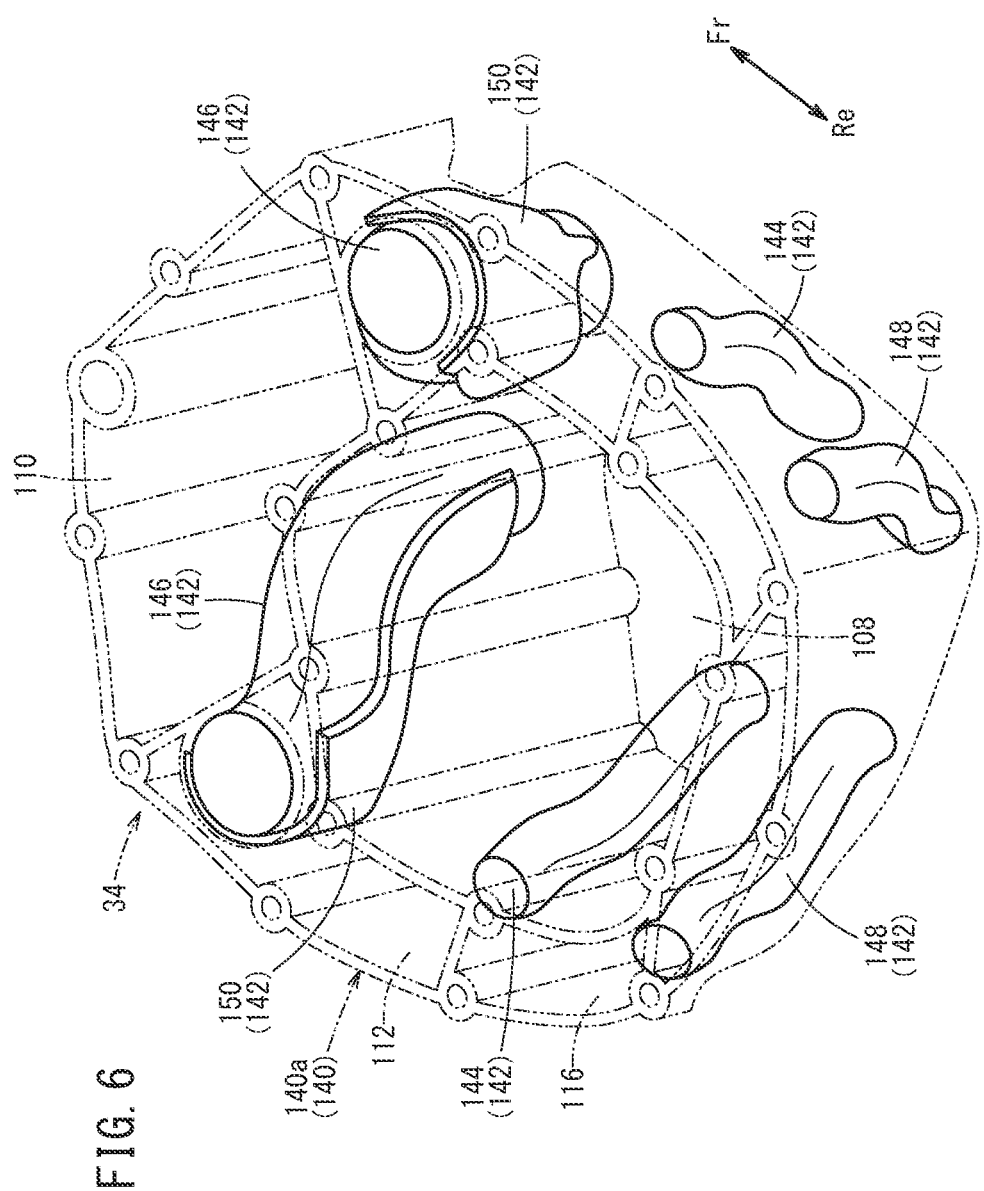
FIG. 6 is an explanatory diagram showing an arrangement state of cores at a time of manufacturing of the oil case.

The above oil case 34 is integrally molded by injection-molding of materials (metal materials or resin materials) configuring the oil case 34. Specifically, as shown in FIG. 6, a plurality of cores 142 are disposed in a cavity 140a of a mold 140 (a fixed mold and a movable mold) capable of molding the outer wall 102 and the partitioning wall 104 of the oil case 34, whereupon injection molding is performed. Each of the cores 142 is configured by sand for casting mold.

The plurality of cores 142 include: a pair of lead-out path-dedicated cores 144 for molding the passages of the pair of lead-out paths 112; a pair of main exhaust path-dedicated cores 146 for molding the pair of main exhaust paths 114; and a pair of subsidiary exhaust path-dedicated cores 148 for molding the passages of the pair of subsidiary exhaust paths 116. Furthermore, the plurality of cores 142 have a pair of gap formation-dedicated cores 150 for being disposed between each of the main exhaust path-dedicated cores 146 and the mold 140 molding the outer wall 102 of the lead-in path 110.

This gap formation-dedicated core 150 is formed in a gutter shape extending along the main exhaust path-dedicated core 146, and, in cross-sectional view orthogonal to its extension direction, has substantially a semicircle having radius of curvature one size larger than that of the main exhaust path-dedicated core 146. The gap formation-dedicated core 150 is disposed in non-contact with (separated by a certain interval from) the main exhaust path-dedicated core 146 in a state of the mold 140 being disposed. As a result, in injection molding of the oil case 34, molten metal or resin flows into between the main exhaust path-dedicated core 146 and the gap formation-dedicated core 150, whereby the tubular wall 106a configuring the main exhaust path 114 is certainly molded. Moreover, the gap formation-dedicated core 150, by its being removed after injection molding, suitably generates the gap 152 (refer to FIG. 3) between the outer wall 102 configuring the lead-in path 110 and the tubular wall 106a configuring the main exhaust path 114.

The gap 152 of the oil case 34 is part of the lead-in path 110 communicating with the lead-in opening 120a, and causes the tubular wall 106a of the main exhaust path 114 to be wholly exposed to the lead-in path 110. In other words, the lead-in path 110 configures a water jacket 154 that brings water into contact with an entire periphery of an outer peripheral surface of the tubular wall 106a due to the gap 152 and a space on an opposite side thereof.

Next, a specific structure of the upper separator 36 (a first case) will be described with reference to FIGS. 7 and 8.

The upper separator 36 has an upper surface shape that allows it to be coupled to the lower portion of the oil case 34 (refer also to FIG. 4). This upper separator 36 includes several spaces formed by a wall portion 200 that includes: an outer wall 202; and a partitioning wall 204 integrally molded with the outer wall 202.

As the spaces, there may be cited: the central exhaust path 206 into which the exhaust gas flows; and the cooling water flow portion 207 that allows the cooling water to flow. Moreover, a front side of the upper separator 36 is provided with a drive shaft-dedicated through-hole 210 that has the drive shaft 24 disposed in a freely rotating manner therein. That is, the upper separator 36 is a molded article of an integrated structure in which the central exhaust path 206, the cooling water flow portion 207, and the drive shaft-dedicated through-hole 210 are integrally formed.

An upper portion of the outer wall 202 of the upper separator 36 is provided with separator upper portion female screw portions 212 that face the oil case lower portion female screw portions 139, and is further provided with unillustrated packing. The oil case lower portion female screw portions 139 and the separator upper portion female screw portions 212 have unillustrated fastening bolts screwed into them from below. As a result, fastening of the oil case 34 and the upper separator 36 is performed.

The central exhaust path 206 is surrounded by the partitioning wall 204 that circles on an inner side of the outer wall 202, and is configured so as to penetrate in the up-down direction of the upper separator 36. The central exhaust path 206 has on its forward side a pair of connecting spaces 214 formed in two circular shapes, and, meanwhile, has on its rear side an extended space 216 formed in a rectangular shape joining up with these connecting spaces 214. A lower portion exhaust port 206a of the central exhaust path 206 is formed in substantially an elliptical shape matching an upper portion shape of the extension case 38.

The pair of connecting spaces 214 respectively face the pair of main exhaust paths 114 (lower portion openings 114b) of the oil case 34. The partitioning wall 204 configuring the pair of connecting spaces 214 directly contacts (or contacts via unillustrated packing or an unillustrated gasket) the tubular wall 106a configuring the pair of main exhaust paths 114 of the oil case 34. The extended space 216 expands the central exhaust path 206 in a rearward direction in planar view to thereby significantly increase a flow path cross-sectional area for the exhaust gas. Therefore, the central exhaust path 206 significantly lowers exhaust pressure of the exhaust gas flowing thereinto from the pair of main exhaust paths 114.

The cooling water flow portion 207 of the upper separator 36 is configured by: a water collecting portion 208 that temporarily stores the cooling water that has flowed out from the oil case 34; and a cooling water outflow portion 220 that allows the cooling water of the water collecting portion 208 to flow out downwardly.

The water collecting portion 208 is formed between the partitioning wall 204 of the central exhaust path 206 and the outer wall 202 of the upper separator 36, and wholly surrounds a periphery of the central exhaust path 206. Specifically, the water collecting portion 208 has: a pair of water collecting side portions 228 positioned on both sides in a width direction of the central exhaust path 206; a water collecting rear portion 230 positioned on a rear side of the central exhaust path 206; and a water collecting front portion 234 positioned on a front side of the central exhaust path 206. Moreover, a front side of the water collecting front portion 234 is provided with a pipe-dedicated hole portion 218 through which the cooling water supply pipe 84 is passed.

On the other hand, the cooling water outflow portion 220 is formed in the outer wall 202 (a water collecting bottom wall 202a) configuring a lower portion of the water collecting portion 208. The cooling water outflow portion 220 includes: a front hole portion 222 provided in the water collecting front portion 234; side hole portions 224 provided in the water collecting side portions 228; and a rear hole portion 226 provided in the water collecting rear portion 230.

The pair of water collecting side portions 228 face the lower portion openings 112a of the pair of lead-out paths 112 in a state of the oil case 34 and the upper separator 36 having been coupled. That is, the cooling discharge water that has flowed downwards along the pair of lead-out paths 112 falls into the water collecting side portions 228 from the lower portion openings 112a. Regarding the side hole portions 224 (first hole portions) of the water collecting side portions 228, a plurality of the side hole portions 224 are provided on each side of the central exhaust path 206, and allow the cooling water (cooling discharge water) of the water collecting side portions 228 to fall downwards.

A barrier 232 of a certain height is provided between each of the pair of water collecting side portions 228 and the water collecting rear portion 230. In the case of a large amount of the cooling water having collected in the pair of water collecting side portions 228, the cooling water flows over the barrier 232 and into the water collecting rear portion 230.

The water collecting rear portion 230 is formed in a tapered shape inclining toward the rear hole portion 226 on its lower portion side, and allows the cooling water of the water collecting side portions 228 to smoothly flow into the rear hole portion 226 when the cooling water has flowed over the barrier 232 and into the rear portion. The rear hole portion 226 (a second hole portion) is formed having the largest flow path cross-sectional area compared to those of the front hole portion 222 and side hole portions 224, and, in addition to allowing the cooling discharge water to downwardly flow, doubles as a subsidiary exhaust gas hole portion (the subsidiary exhaust gas passage 76) for allowing flow of the idling time exhaust gas. That is, a space of the water collecting rear portion 230 functions also as the subsidiary exhaust port 230a for allowing the idling time exhaust gas that has passed through the rear hole portion 226 to upwardly flow.

The water collecting front portion 234 is disposed in a position overlapping the lead-in path 110 in a state of the oil case 34 and the upper separator 36 having been coupled. The water collecting front portion 234 stores the cooling supply water that has fallen from the drain holes 122 of the oil case 34. The front hole portion 222 of the water collecting front portion 234 includes: a pair of small diameter hole portions 222a provided at positions forwardly separated from the pipe-dedicated hole portion 218; and a large diameter hole portion 222b larger than the small diameter hole portions 222a, the large diameter hole portion being provided at a position in a vicinity of the rear of the pipe-dedicated hole portion 218. The pair of small diameter hole portions 222a and the large diameter hole portion 222b allow the cooling water (the cooling supply water) of the water collecting front portion 234 to flow downwardly out.

Figure 9:
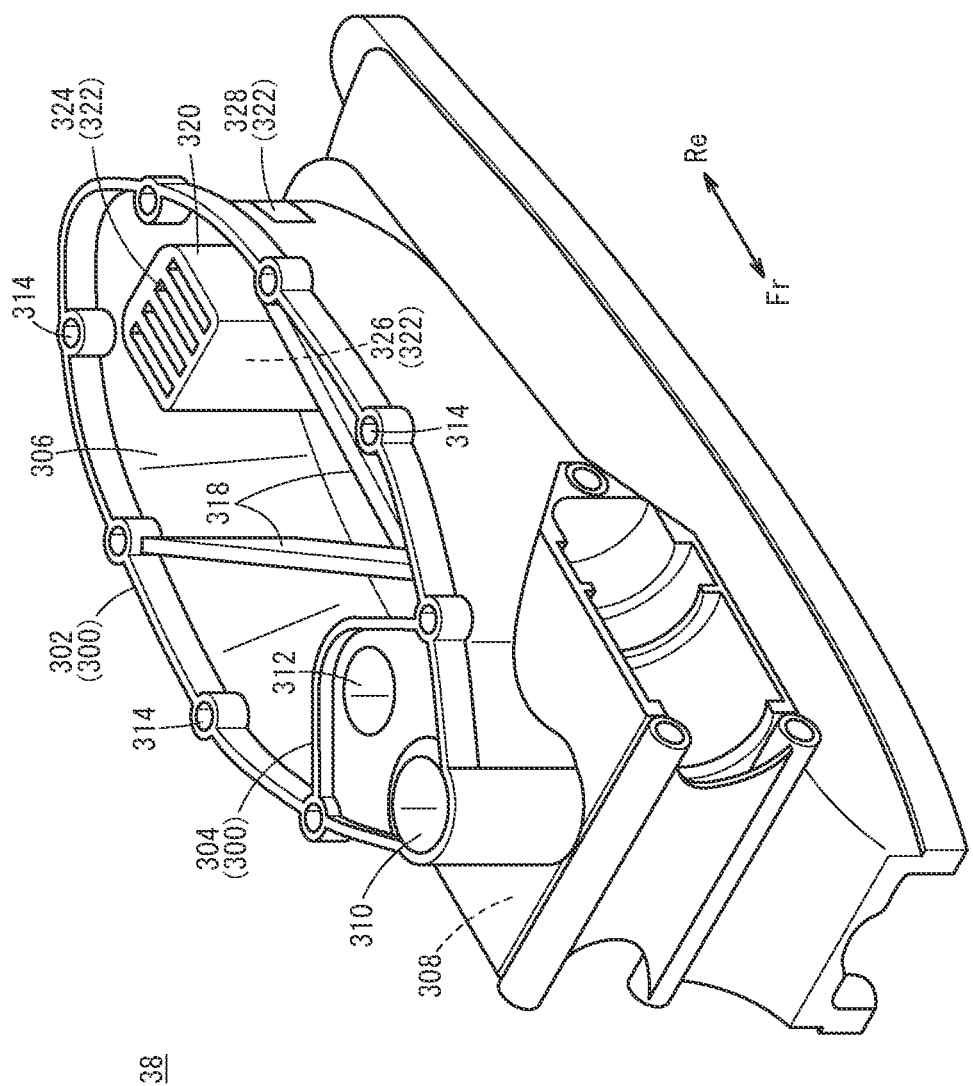
FIG. 9 is a perspective view of an extension case seen from its upper surface side.

Next, a specific structure of the extension case 38 (a second case) will be described with reference to FIGS. 9 and 10.

The extension case 38 is separably coupled to the upper separator 36 on a lower side of the upper separator 36. To achieve that, the extension case 38 has an upper surface shape (substantially an elliptical shape) that allows it to be coupled to the lower portion of the upper separator 36. The extension case 38 includes therein several spaces defined by a wall portion 300 that includes: an outer wall 302; and a partitioning wall 304 integrally molded with the outer wall 302.

As the spaces, there may be cited: the mixing space 306 where the exhaust gas and the cooling water mix on an inner side of the outer wall 302; and a pump disposing portion 308 that houses the water pump 82 forward of the mixing space 306. Moreover, a front (an arrow Fr direction) side of the extension case 38 is provided with: a drive shaft-dedicated through-hole 310 that has the drive shaft 24 disposed in a freely rotatable manner therein; and a pipe-dedicated hole portion 312 through which the cooling water supply pipe 84 is passed at a position behind the drive shaft-dedicated through-hole 310.

An upper portion of the outer wall 302 of the extension case 38 is provided with extension case upper portion female screw portions 314 that face separator lower portion female screw portions 236, and is further provided with unillustrated packing. The separator lower portion female screw portions 236 and the extension case upper portion female screw portions 314 have unillustrated fastening bolts screwed into them from below. As a result, fastening of the upper separator 36 and the extension case 38 is performed.

In the mixing space 306, its upper portion opens so as to face the central exhaust path 206 of the upper separator 36 and the plurality of cooling water outflow portions 220 of the water collecting portion 208. Therefore, the exhaust gas flowing downwardly from the central exhaust path 206 and the cooling water flowing downwardly from the water collecting portion 208 mix in the mixing space 306 to become the mixed fluid. The lower portion of the extension case 38 is provided with a quadrangular discharge port 316 (the mixed fluid passage 78) that discharges the mixed fluid of the mixing space 306.

Moreover, an inner surface of the extension case 38 configuring the mixing space 306 is provided with a pair of crosslinking bodies 318 that extend in diagonal directions (inclined to the front-rear direction and the width direction). The pair of crosslinking bodies 318 are coupled to each other at a central position in the width direction. The pair of crosslinking bodies 318 allow the exhaust gas to flow downwardly in an appropriately turbulent manner, and promote mixing of the exhaust gas and the cooling water.

Furthermore, a rear (an arrow Re direction) side of the extension case 38 is provided with a projecting portion 320 that projects in an upward direction from the partitioning wall 304 (a rear bottom wall 304a) configuring the lower portion of the extension case 38. The mixing space 306 on the rear side of the projecting portion 320 faces the rear hole portion 226 of the upper separator 36. The cooling water that has fallen from the rear hole portion 226 flows around and along sides (a periphery) of the projecting portion 320 from the rear bottom wall 304a on a rear side of the projecting portion 320 and toward the discharge port 316.

The projecting portion 320 is provided with a reversing time-dedicated exhaust path 322 that discharges from the mixing space 306 the exhaust gas that fills the mixing space 306 mainly at a time of reversing of the ship body Sh. The reversing time-dedicated exhaust path 322 is configured by: a plurality of reversing time-dedicated communicating ports 324 which are formed in an upper end (a projecting end) of the projecting portion 320; a cavity portion 326 within the projecting portion 320, that communicates with the reversing time-dedicated communicating ports 324; and a reversing time-dedicated exhaust port 328 which is formed in a side surface of the outer wall 302 of the extension case 38 and communicates with the cavity portion 326. The reversing time-dedicated exhaust port 328 communicates with a reversing time exhaust opening 330 (refer to FIG. 1) provided in a certain position of the housing 12.

As shown in FIG. 2, the transom adjustment case 39 is provided on a lower side of the extension case 38 and between the extension case 38 and the gear case 50, and is separably coupled to the extension case 38 and the gear case 50. This transom adjustment case 39 is a member that adjusts an up-down height of the cooling structure 66 according to a size of the engine 22 (a height in the up-down direction of the housing 12) of the outboard motor 10, and that allows the gear case 50 to be disposed in an appropriate position. Hence, depending on the size of the outboard motor 10, there may be no need for the transom adjustment case 39 to be provided.

The transom adjustment case 39 has an upper surface shape that allows it to be coupled to the lower portion of the extension case 38. Moreover, an inner side of the transom adjustment case 39 is provided with: a mixed fluid-dedicated space portion 39a that allows the mixed fluid to flow; and a drive shaft-dedicated through-hole (not illustrated) in which the drive shaft 24 is disposed and pipe-dedicated hole portion (not illustrated) in which the cooling water supply pipe 84 is disposed. The mixed fluid-dedicated space portion 39a is formed penetrating in the up-down direction of the transom adjustment case 39.

Moreover, in the case of the outboard motor 10 not being provided with the transom adjustment case 39, there should be prepared a plurality of either the upper separators 36 or the extension cases 38 having different heights in the up-down direction. For example, in the case of a plurality of the upper separators 36 having different heights in the up-down direction having been prepared, the upper separator 36 having an up-down height appropriate to the size (the up-down height) of the outboard motor 10 is selected and installed between the oil case 34 and the extension case 38. The upper separators 36 having different heights should have each of their central exhaust paths 206 and cooling water flow portions 207 (water collecting portions 208) formed long in the up-down direction.

Alternatively, in the outboard motor 10, there may be adopted a configuration where, by a plurality of the upper separators 36 (the extension cases 38) being stacked, the height in the up-down direction is adjusted in a stepwise manner. In the case of a plurality of the upper separators 36 being stacked, the upper separators 36 should be formed so that their upper surface shapes and their lower surface shapes match.

The control unit 30 of the outboard motor 10 is configured as a computer (ECU: Electronic Control Unit) having an unillustrated processor, memory, and input/output interface, and controls operation of the outboard motor 10. For example, the control unit 30 operates the water pump 82 to circulate the cooling water, in coordination with rotational drive of the engine 22.

The outboard motor 10 (the oil case 34, the upper separator 36, and the extension case 38) according to the present embodiment is basically configured as above, and description will be given concerning its operation below.

As shown in FIGS. 1 and 2, in the cooling structure 66 of the outboard motor 10, during operation of the engine 22, the control unit 30 controls operation of the water pump 82, whereby cooling water on the outside of the outboard motor 10 (the housing 12) is taken in from the water intake port 68 and guided upwardly through the cooling water inlet path 70. After the cooling supply water has passed through the cooling water screen 80 and the water pump 82, it flows along the cooling water supply pipe 84 and is guided into the lead-in path 110 from the lead-in port 120 of the oil case 34.

Due to this cooling supply water continuously flowing into the lead-in path 110 of the oil case 34, water level of the cooling supply water proceeds to increase within the lead-in path 110. As shown in FIGS. 2 and 3, in the lead-in path 110, there exist the tubular walls 106a of the pair of main exhaust paths 114, and in the pair of main exhaust paths 114, there flows the exhaust gas of the engine 22. The cooling supply water that has flowed into the lead-in path 110 permeates also into the gap 152 (the water jacket 154) between the outer wall 102 and the tubular wall 106*a*, and surrounds the entire periphery of the outer peripheral surface of the tubular wall 106*a* to thereby cool the exhaust gas. Then, the cooling supply water of the lead-in path 110 passes along the communicating path from the side portion chambers 128, flows into the cooling water jacket 22*a* of the engine 22, and thereby cools the engine 22.

The cooling water that has cooled the engine 22 is discharged into (the spaces in the upper portions of) the pair of lead-out paths 112 of the oil case 34 from the engine 22, as the cooling discharge water. This cooling discharge water flows downwardly through the insides of the pair of lead-out paths 112, and, at this time, passes along the tubular walls 106*b* exposed in the oil chamber 108. As a result, the cooling discharge water cools the lubricating oil stored in the oil chamber 108, and the cooled lubricating oil promotes lubrication of the engine 22.

Figure 7:
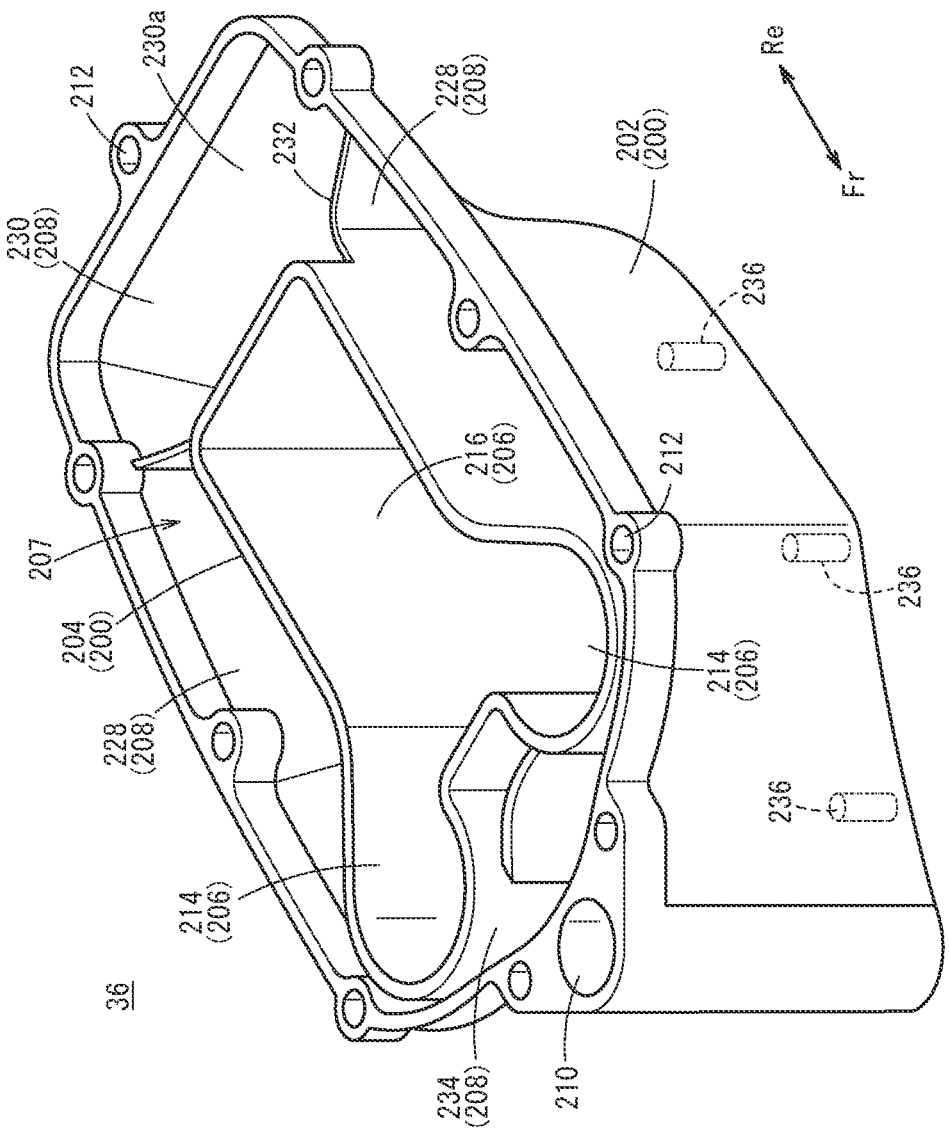
FIG. 7 is a perspective view of an upper separator seen from its upper surface side.
Figure 8:
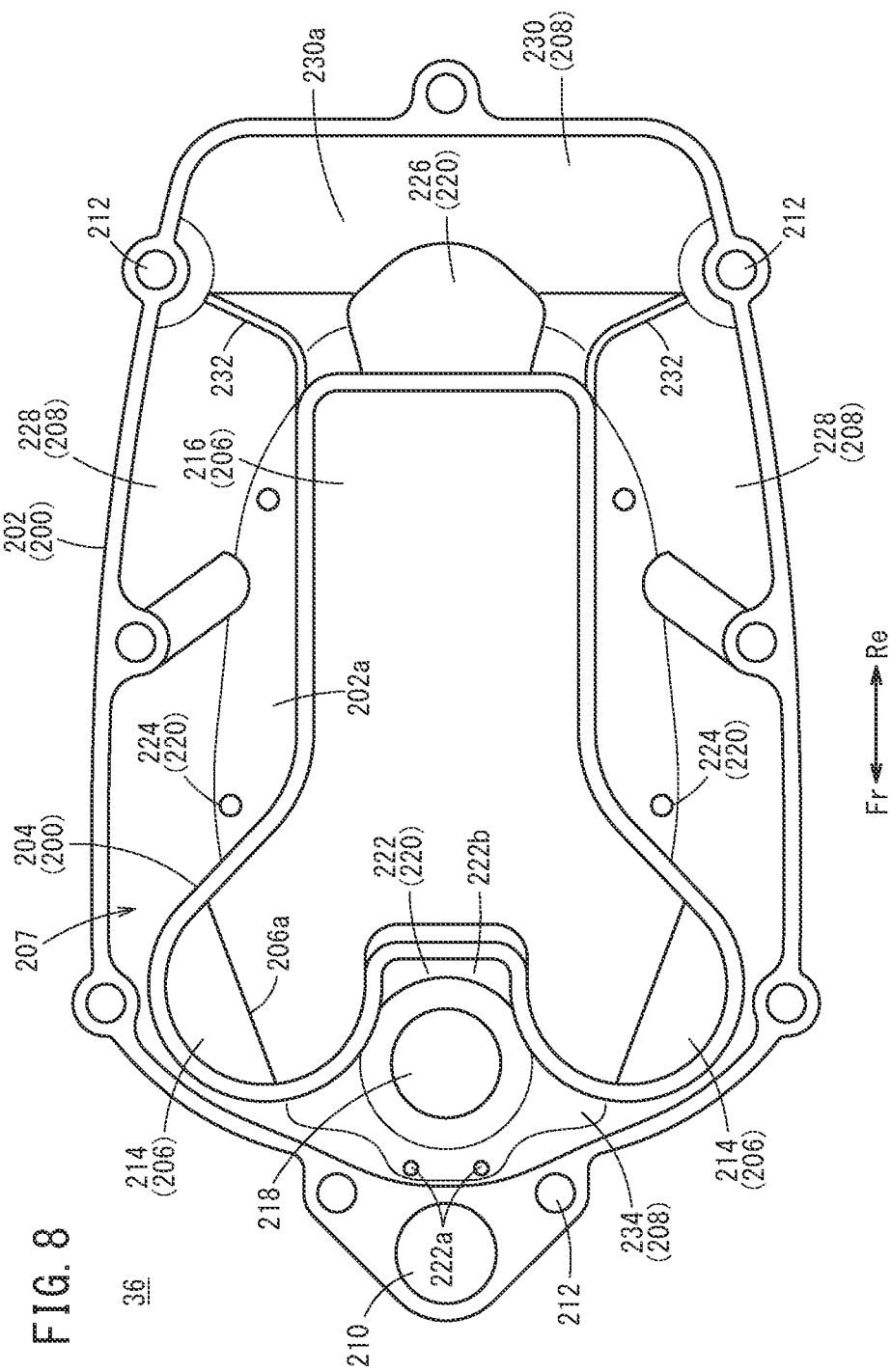
FIG. 8 is a plan view of the upper separator.

As shown in FIGS. 2, 7, and 8, the cooling discharge water falls into the water collecting portion 208 (the water collecting side portions 228) of the upper separator 36 from the lower portion openings 112*a* of the lead-out paths 112, and is temporarily stored in the water collecting portion 208. Then, the cooling discharge water flows out to below the upper separator 36 from the cooling water outflow portions 220 (the side hole portions 224) provided in the water collecting portion 208. In the case of water level of the cooling discharge water having increased in the water collecting side portions 228, the cooling discharge water flows over the barriers 232 and into the water collecting rear portion 230, and flows out from the rear hole portion 226 of the water collecting rear portion 230. Moreover, the water collecting front portion 234 temporarily stores the cooling supply water that has fallen from the drain holes 122 of the oil case 34, and then causes it to flow out downwardly from the front hole portion 222.

On the other hand, the exhaust gas of the engine 22 flows into the pair of main exhaust paths 114 from the engine 22, and flows downwardly along insides of each of the main exhaust paths 114 (refer also to FIG. 3). As mentioned above, in the pair of main exhaust paths 114, the exhaust gas is cooled by the cooling supply water of the lead-in path 110. The exhaust gas is discharged into the connecting spaces 214 of the central exhaust path 206 of the upper separator 36 from the lower portion openings 114*b* of the pair of main exhaust paths 114. In the central exhaust path 206, the exhaust gas spreads in the planar direction (in the extended space 216), whereby its exhaust pressure is reduced. Moreover, the exhaust gas of the central exhaust path 206 is cooled even further by the cooling water collecting in the water collecting portion 208. Furthermore, by the water collecting portion 208 existing in a periphery of the central exhaust path 206, the central exhaust path 206 suppresses exhaust noise of the exhaust gas.

As shown in FIGS. 2, and 8 to 10, the exhaust gas flows into the mixing space 306 of the extension case 38 from the lower portion exhaust port 206*a* of the upper separator 36, whereupon, in the mixing space 306, it mixes with the cooling water to become the mixed fluid. The exhaust gas is cooled further due to this mixing. The mixed fluid passes along the mixed fluid passage 78 (the discharge port 316, the transom adjustment case 39, a space between the housing 12 and the gear case 50, and the through-hole 65 of the propeller main body 64) and is then discharged to outside of the housing 12 from the through-hole 65.

Moreover, as shown in FIGS. 2 and 8, at a time of low-speed rotation of the engine 22, the idling time exhaust gas collecting in the mixing space 306 of the extension case 38 is allowed to flow into the water collecting rear portion 230 (the subsidiary exhaust port 230*a*) of the upper separator 36 from the rear hole portion 226. The idling time exhaust gas flows upward along the water collecting rear portion 230 to flow into the lower portion openings 116*a* of the subsidiary exhaust paths 116 of the oil case 34 and, after having flowed through the subsidiary exhaust paths 116, is discharged to outside from the exhaust port 86 of the housing 12.

Figure 10:
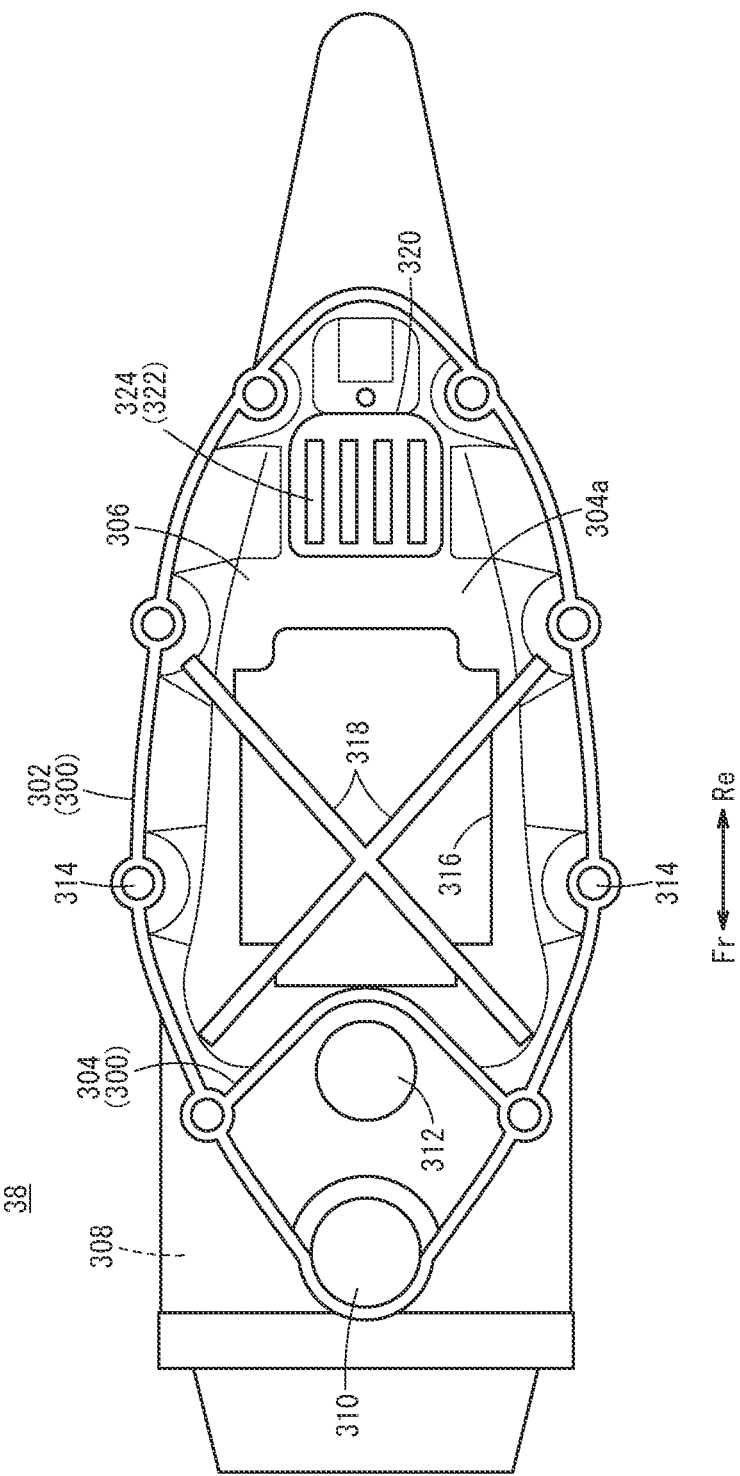
FIG. 10 is a plan view of the extension case.

Furthermore, as shown in FIG. 10, when the ship body Sh goes in reverse, the reversing time-dedicated exhaust path 322 allows the exhaust gas collecting in the mixing space 306 to flow via the reversing time-dedicated communicating ports 324, the cavity portion 326, and the reversing time-dedicated exhaust port 328, to be discharged to outside of the housing 12 from the reversing time exhaust opening 330, based on there being a fall in the mixed fluid being discharged from the through-hole 65.

Technical ideas and advantages understandable from the above-mentioned embodiment will be described below.

In the above-described outboard motor 10, the exhaust gas of the exhaust gas channel (the central exhaust path 206) is cooled by the cooling water flow portion 207 on the outer side in the first case (the upper separator 36), and, furthermore, the exhaust gas and the cooling water are mixed in the second case (the extension case 38). As a result, the exhaust gas is significantly cooled. Moreover, while the exhaust gas flows through the central exhaust path 206 on the inner side, the cooling water flows through the cooling water flow portion 207 on the outer side. As a result, exhaust noise of the exhaust gas is suppressed. Moreover, in the upper separator 36, the central exhaust path 206 and the cooling water flow portion 207 form an integral structure, so a portion for connection of an exhaust tube or the like becomes unnecessary, and downsizing and cost reduction of the outboard motor 10 are achieved. Moreover, in the upper separator 36, the exhaust gas and the cooling water flow along different paths, hence intrusion of cooling water into the central exhaust path 206 and the main exhaust path 114 of the oil case 34 can be suppressed. Furthermore, regarding the mutually separable upper separator 36 and extension case 38, all that is required when sizes of outboard motors 10 differ is that, for either one of the cases, there be prepared cases having different heights or there be laminated a plurality of cases. As a result, manufacturing costs can be further reduced. Moreover, in the outboard motor 10, the water jacket (the cooling water flow portion 207) and the extension case 38 are formed as one body, not separate bodies, so surface rigidity of the outer wall 202 of the upper separator 36 improves, and a reduction in noise due to this improvement in surface rigidity can be expected. Moreover, consolidation of the number of components due to integral formation of the water jacket results in assembly man-hours at a factory being reduced, and enables easiness-of-assembly and decrease in manufacturing costs to be achieved.

Moreover, the first case (the upper separator 36) has: the water collecting portion 208 acting as the cooling water flow portion 207, that temporarily stores the cooling water that has flowed out from the oil case 34; and the cooling water outflow portion 220 that allows the cooling water of the water collecting portion 208 to flow out downwardly. Thus, due to the cooling water that has collected in the water collecting portion 208 of the upper separator 36, the outboard motor 10 is able to suppress exhaust noise while effectively cooling the exhaust gas.

Moreover, the outboard motor 10 has the subsidiary exhaust gas passage 76 that guides the exhaust gas during low-speed rotation of the internal combustion engine (the engine 22), the cooling water outflow portion 220 includes: the first hole portion (the side hole portion 224); and the second hole portion (the rear hole portion 226) that has a larger flow path cross-sectional area than the side hole portion 224 and serves also as the subsidiary exhaust port 230a configuring the subsidiary exhaust gas passage 76, and the water collecting portion 208 allows the cooling water to flow out from the side hole portion 224, and, in the case of the cooling water having flowed over the barrier 232 partitioning the space within the water collecting portion 208, allows the cooling water to flow out from the rear hole portion 226. Thus, the outboard motor 10, in addition to allowing the cooling water that has collected in the water collecting portion 208 to flow out from the side hole portion 224, utilizes the rear hole portion 226 (the subsidiary exhaust port 230a) to allow the cooling water that has collected up to the barrier 232 to flow out. As a result, the outboard motor 10 can appropriately collect the cooling water and thereby increase a cooling effect, and can allow the cooling water to flow out smoothly.

Moreover, the outboard motor 10 includes: the cooling water inlet path 70 that takes in, from outside of the outboard motor 10, cooling supply water being the cooling water, and guides the cooling supply water to the internal combustion engine (the engine 22); and the cooling water outlet path 72 that guides, to the lower side, cooling discharge water being the cooling water that has cooled the engine 22, and the water collecting portion 208 includes each of a place (the water collecting front portion 234) for storing the cooling supply water and a place (the water collecting side portion 228) for storing the cooling discharge water. As a result, the water collecting portion 208 is able to secure a flow path of the exhaust gas, and, at the same time, utilize also the cooling supply water to cool the exhaust gas.

Moreover, the oil case 34 has the main exhaust path 114 allowing the exhaust gas to flow out into the exhaust gas channel (the central exhaust path 206), and the flow path cross-sectional area of the central exhaust path 206 is larger than the flow path cross-sectional area of the main exhaust path 114. As a result, when the exhaust gas has flowed into the central exhaust path 206 of the upper separator 36, the exhaust gas can spread out within the central exhaust path 206 and have its exhaust pressure favorably lowered.

Moreover, the second case (the extension case 38) has the reversing time-dedicated exhaust path 322 for discharging the exhaust gas that internally collects at a time when the outboard motor 10 goes in reverse. As a result, the outboard motor 10 can favorably discharge the exhaust gas from the extension case 38 even when in reverse.

Moreover, the second case (the extension case 38) includes the projecting portion 320 projecting toward the first case (the upper separator 36), and has a configuration in which the cooling water that has flowed in from the upper separator 36 is caused to flow around and along the side of the projecting portion 320, and the reversing time-dedicated exhaust path 322 includes the cavity portion 326 formed inside the projecting portion 320 and the reversing time-dedicated communicating port 324 communicating with the cavity portion 326 and formed in an upper end of the projecting portion 320. This makes it possible for the outboard motor 10 to allow the exhaust gas at a time of reversing to be discharged through the inside of the projecting portion 320, while at the same time making it possible for the outboard motor 10 to cause a large amount of the cooling water to flow around and along the side of the projecting portion 320 and thereby be allowed to flow downwardly out.

Moreover, the outboard motor 10 further includes the gear case 50 transmitting rotational speed of the internal combustion engine (the engine 22), and the transom adjustment case 39 between the upper separator 36 and the gear case 50. Thus, in the case of the outboard motor 10 having its size changed depending on the capacity of the engine 22, and so on, its height in the up-down direction can be adjusted by the transom adjustment case 39, without sizes of the upper separator 36 and extension case 38 being changed. It is therefore made possible for manufacturing costs to be reduced even more.

Moreover, there may be adopted a configuration where, concerning either one of the first case and the second case (the upper separator 36, the extension case 38), a plurality of cases which have different heights in the up-down direction are prepared, and the one case is changed according to the height of the outboard motor 10 in the up-down direction. Thus, in the case of the outboard motor 10 having its size changed depending on the capacity of the engine 22, and so on, its height in the up-down direction can be adjusted by changing either one of the upper separator 36 and extension case 38, hence, a lowering of costs can be promoted in the outboard motor 10.

Moreover, the oil case 34 includes: the oil chamber 108 for storing the lubricating oil; the cooling water channel (the lead-in path 110, the lead-out path 112) allowing the cooling water to flow; and the main exhaust path 114 that guides the exhaust gas of the internal combustion engine (the engine 22) to the lower side, and the oil chamber 108, the cooling water channel, and the main exhaust path 114 form an integral structure. This makes it possible for the oil case 34 and upper separator 36 of the outboard motor 10 to be coupled by being simply assembled, and enables manufacturing costs of the outboard motor 10 to be significantly reduced. That is, in the oil case 34 too, a conventional exhaust gas piping arrangement configured by a separate member can become unnecessary, hence the number of components is decreased, and work man-hours during manufacturing or during maintenance are thereby reduced. Furthermore, since the oil case 34 being an integral structure can dispense with a portion for connection of the exhaust gas piping arrangement, it becomes possible for downsizing of the oil case 34 to be achieved by a simple structure.

Note that the present invention is not limited to the above-mentioned embodiment, and that a variety of modifications thereto are possible in line with the spirit of the invention.

What is claimed is:

1. An outboard motor comprising an internal combustion engine and a cooling structure, the cooling structure cooling an exhaust gas of the internal combustion engine, on a lower side of the internal combustion engine,
   the cooling structure comprising:
   an oil case that stores a lubricating oil of the internal combustion engine;
   a first case which is disposed on a lower side of the oil case, the first case including an exhaust gas channel that allows the exhaust gas of the internal combustion engine to flow and a cooling water flow portion that allows cooling water to flow on an outer side of the exhaust gas channel, the exhaust gas channel and the cooling water flow portion forming an integral structure; and a second case which is separably coupled to the first case on a lower side of the first case, and in which the exhaust gas that has flowed through the exhaust gas channel and the cooling water that has flowed through the cooling water flow portion are mixed.

2. The outboard motor according to claim 1, wherein the first case has:
a water collecting portion acting as the cooling water flow portion, that temporarily stores the cooling water that has flowed out from the oil case; and
a cooling water outflow portion that allows the cooling water of the water collecting portion to flow out downwardly.

3. The outboard motor according to claim 2, wherein the outboard motor includes a subsidiary exhaust gas passage that guides the exhaust gas during low-speed rotation of the internal combustion engine,
the cooling water outflow portion includes: a first hole portion; and a second hole portion that has a larger flow path cross-sectional area than the first hole portion and serves also as a subsidiary exhaust port configuring the subsidiary exhaust gas passage, and
the water collecting portion allows the cooling water to flow out from the first hole portion, and, in a case of the cooling water having flowed over a barrier partitioning a space within the water collecting portion, allows the cooling water to flow out from the second hole portion.

4. The outboard motor according to claim 2, wherein the outboard motor includes: a cooling water inlet path that takes in, from outside of the outboard motor, cooling supply water being the cooling water, and guides the cooling supply water to the internal combustion engine; and a cooling water outlet path that guides, to a lower side, cooling discharge water being the cooling water that has cooled the internal combustion engine, and
the water collecting portion comprises each of a place that stores the cooling supply water and a place that stores the cooling discharge water.

5. The outboard motor according to claim 1, wherein the oil case includes a main exhaust path allowing the exhaust gas to flow out into the exhaust gas channel, and
a flow path cross-sectional area of the exhaust gas channel is larger than a flow path cross-sectional area of the main exhaust path.

6. The outboard motor according to claim 1, wherein the second case has a reversing time-dedicated exhaust path configured to discharge the exhaust gas that internally collects at a time when the outboard motor goes in reverse.

7. The outboard motor according to claim 6, wherein the second case comprises a projecting portion projecting toward the first case, and has a configuration in which the cooling water that has flowed in from the first case is caused to flow around and along a side of the projecting portion, and
the reversing time-dedicated exhaust path includes a cavity portion formed inside the projecting portion and a reversing time-dedicated communicating port communicating with the cavity portion and formed in an upper end of the projecting portion.

8. The outboard motor according to claim 1, further comprising:
a gear case that transmits a rotational speed of the internal combustion engine; and
a transom adjustment case disposed between the second case and the gear case.

9. The outboard motor according to claim 1, wherein concerning either one of the first case and the second case, a plurality of cases which have different heights in an up-down direction are prepared, and the one of the first case and the second case is changed according to a height of the outboard motor in the up-down direction.

10. The outboard motor according to claim 1, wherein the oil case comprises:
an oil chamber that stores the lubricating oil;
a cooling water channel that allows the cooling water to flow; and
a main exhaust path that guides the exhaust gas of the internal combustion engine to a lower side, and
the oil chamber, the cooling water channel, and the main exhaust path form an integral structure.

* * * * *